United States Patent [19]
Lecerf

[11] 4,184,016
[45] Jan. 15, 1980

[54] DOUBLE CHROMATE COMPOSITION FOR USE AS A POSITIVE ACTIVE MATERIAL IN BATTERIES AND BATTERY

[75] Inventor: Andre Lecerf, Pace, France

[73] Assignee: Saft-Societe des Accumulateurs Fixes et de Traction, Romainville, France

[21] Appl. No.: 952,089

[22] Filed: Oct. 17, 1978

[30] Foreign Application Priority Data

Oct. 18, 1977 [FR] France .................... 77 31272

[51] Int. Cl.$^2$ ............................................. H01M 6/14
[52] U.S. Cl. .................................... 429/194; 429/219; 423/595
[58] Field of Search .................... 429/194, 218, 219; 423/595, 58

[56] References Cited

U.S. PATENT DOCUMENTS 3,853,627  12/1974  Lehmann et al. ............. 429/194 X
3,925,101  12/1975  Lehmann et al. ............. 429/194

*Primary Examiner*—Charles F. LeFevour
*Attorney, Agent, or Firm*—Kenyon & Kenyon

[57] ABSTRACT

Novel double chromate compositions having the general formula:

$$MM'(CrO_4)_2,$$

wherein M and M' are silver and bismuth, respectively. Methods of making $AgBi(CrO_4)_2$ are characterized by reacting silver dichromate with a bismuth salt to provide equal numbers of silver and bismuth atoms. These double chromate compositions have particular utility in batteries as active positive material. Due to the steadiness of discharge voltage and duration of discharge of batteries employing these double chromate compositions, such batteries are especially adapted for use in clocks and in cardiostimulators or pacemakers.

6 Claims, 1 Drawing Figure

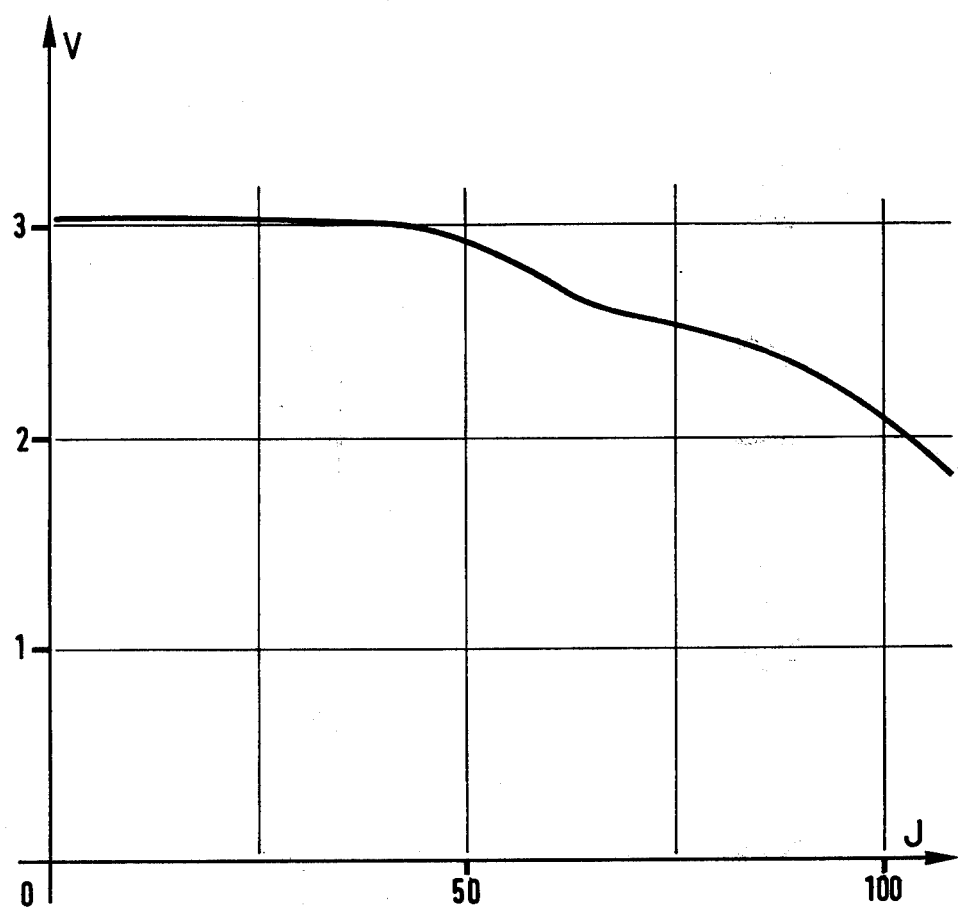

DOUBLE CHROMATE COMPOSITION FOR USE AS A POSITIVE ACTIVE MATERIAL IN BATTERIES AND BATTERY

BACKGROUND OF THE INVENTION

This invention relates to a new chemical composition, and more particularly to a double chromate having the formula MM' $(CrO_4)_2$ where M and M' represent metals, to methods of making it, and to its use as a positive active material in batteries.

From the disclosure of French Pat. No. 2,110,765, a lithium battery is known having positive active material constituting silver chromate having the formula $Ag_2CrO_4$. One of the great interests in this type of battery is that the reduction in metallic silver occurs, with sufficiently small currents, at a level of about 3 volts, with good yield and stability, so that such a battery can be used in applications such as clocks or cardio-stimulators. This active material has given fully satisfactory results, but it is relatively expensive.

Other chromates have been proposed as the active positive material for batteries, for example, chromates of copper, of iron, of cobalt, of nickel, of mercury, of thalium, and of bismuth, but aside the fact that the existence of certain of these chromates is doubtful, their stability and discharge voltage would be inferior to the above-mentioned silver chromate.

SUMMARY OF THE INVENTION

The composition which is the subject of the present invention is a double-chromate of silver and bismuth, having the formula $AgBi(CrO_4)_2$.

The invention equally concerns a process for the preparation of the said silver and bismuth double chromate, which process is characterized by the fact that it utilizes the reaction of silver dichromate with a salt of bismuth, in a molar ratio providing one atom of bismuth per atom of silver.

In a particular process of this invention, the bismuth salt used is the chromate-dichromate, $Bi_2(CrO_4)_2 Cr_2O_7$, and the reaction proceeds as follows:

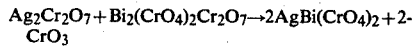

$$Ag_2Cr_2O_7 + Bi_2(CrO_4)_2Cr_2O_7 \rightarrow 2AgBi(CrO_4)_2 + 2CrO_3$$

In this particular embodiment, the reactants can be solid, moistened with a small quantity of solvent, and stirred at least intermittently. Preferably, the reaction mixture is heated. By way of example, water may be used as the solvent, using approximately one part by weight of water to two parts by weight of chromate-dichromate of bismuth.

Bismuth chromate-dichromate, itself, may be obtained by adding a bismuth salt, preferably in solid state, to an aqueous saturated solution of chromic anhydride, $CrO_3$. A bismuth salt which could be used is bismuth nitrate.

In another process of this invention, the salt of bismuth which reacts with the silver dichromate may be a salt as soluble in water as bismuth nitrate, and the reaction takes place in a saturated solution of chromic anhydride $CrO_3$. The precipitate obtained, consisting essentially of double dichromate of silver and bismuth, is converted to double chromate of silver and bismuth by treatment with water.

Another object of the invention is the use of double chromate of silver and bismuth as an active material in batteries. In accordance with this aspect of this invention, the double chromate of silver and bismuth can be used as the positive active material in batteries having high specific energy, more especially, in lithium batteries with an electrolyte that is liquid at ordinary temperatures.

BRIEF DESCRIPTION OF THE DRAWING

The single FIGURE is a plot of discharge voltage vs. time in days of a cell according to the invention.

DETAILED DESCRIPTION OF THE PREFERRED EMBODIMENTS

By way of illustration and not as a limitation, two examples of methods of preparation of a double chromate of silver and bismuth are described below in more detail, the first method starting with bismuth chromate-dichromate, the chromate-dichromate being obtained by reaction of bismuth nitrate with $CrO_3$, and the second example starting directly with bismuth nitrate and $CrO_3$.

EXAMPLE I

1. Preparation of Bismuth Chromate-Dichromate

A saturated, aqueous solution of chromic anhydride, $CrO_3$, is prepared at ambient temperature of about 20° C. To one liter of this solution is added 800 g of bismuth nitrate in solid form, having the formula $Bi(NO_3)_3$ 5 $H_2O$, while stirring continuously. The bismuth nitrate begins to dissolve in the solution of $CrO_3$, and after about one hour, an orange solid begins to precipitate. Precipitation is allowed to continue for approximately 24 hours. The orange precipitate is bismuth chromate-dichromate, $Bi_2(CrO_4)_2Cr_2O_7$.

The solution must be saturated with $CrO_3$, otherwise a basic chromate, $BiOHCrO_4$, will form. The indicated proportions (one liter of solution for 800 g of bismuth nitrate) have been determined to provide for effective agitation of the suspension. Taking account of the concentration of $CrO_3$ to saturation (approximately 6 moles per liter), the proportions imply a large excess of $CrO_3$, which remains in solution and is not involved in the reaction. In fact, this excess would not be necessary if the nitrate of bismuth were added in solution form, but it would then be necessary to acidify that solution to avoid the precipitation of $BiOHCrO_4$.

Bismuth nitrate has been chosen from the readily available salts of bismuth because of its high solubility in water. It could be replaced by another soluble salt, for example, bismuth perchlorate.

The precipitate of $Bi_2(CrO_4)_2Cr_2O_7$ is separated by filtration and is washed on the filter, using 0.1M solution of $CrO_3$ in N/10 nitric acid. The washing is terminated by placing the precipitate in suspension in acetone and refiltering the precipitate, then eliminating the acetone by drying.

The composition of the solution used to wash the precipitate was chosen to assure good elimination of ions in solution while avoiding at the same time dissolution and hydrolysis of the chromate-dichromate. The composition of this washing solution may be modified, but it is necessary to keep it acidic to avoid hydrolysis.

Analysis shows that the amounts of bismuth and chromium of the product are very close to the theoretical values corresponding to the formula $Bi_2(CrO_4)_2Cr_2O_7$.

2. Preparation of Double Chromate

This process of the present invention consists of reacting bismuth chromate-dichromate with silver dichromate.

It is to be noted that the preparation of $Bi_2(CrO_4)_2Cr_2O_7$ has been described in detail above in order to facilitate reproduction of the invention, this product not being available currently. But the chromate-dichromate of bismuth may be utilized in the process of the present invention independently of its manner or method of preparation.

As to silver dichromate, it can be prepared, by way of a nonlimiting example, in the manner described in U.S. Pat. No. 4,032,624, incorporated by reference.

The reaction that takes place is the following:

$$Ag_2Cr_2O_7 + Bi_2(CrO_4)_2Cr_2O_7 \rightarrow 2AgBi(CrO_4)_2 + 2CrO_3.$$

The procedure is to mix, in equimolar quantities, silver dichromate and bismuth chromate-dichromate, adding 1 part by weight of water for two parts by weight of bismuth chromate-dichromate. The resulting paste is heated to a temperature between 100° C. to 200° C. for 24 to 48 hours, depending upon the effectiveness of agitation.

To prepare a small quantity of the product (several tens of grams) the simplest method is to place the reaction mixture in a pyrex tube. To this is added several pyrex marbles or small balls, the tube is sealed and maintained at 200° C. for 48 hours, being agitated two or three times.

To prepare a larger quantity, the simplest method is to use an unsealed reactor to a temperature not exceeding 100° C. 24 hours of reaction time at this temperature is sufficient if an effective and constant agitation is maintained.

The reaction temperature can be chosen anywhere between 100° C. to 200° C. At higher temperatures, parasitic phenomena of oxidation-reduction will appear. It is also possible to operate or to effect the reaction at lower temperatures, but the reaction then proceeds more slowly.

The reaction will not take place dry; it is necessary to moisten the mixture with a solvent, the simplest being water. The quantity of water used in the reaction must be sufficiently low to avoid hydrolysis, yet enough is needed to well moisten the reactants. The quantity indicated above constitutes a good compromise. Alternatively, water can be replaced by another solvent of the reactants that is sufficiently inert with respect to them and to the resulting double chromate of silver and bismuth. Taking into account that it is sufficient to dissolve traces of the reactants, a number of liquids can be used. For example, acetic acid has been tried with success.

When the reaction is finished, the mixture is placed on a filter, and the concentrated solution of $CrO_3$ is eliminated by a brief washing with a solution of N/10 nitric acid. The produce is then removed from the filter, washed with a large quantity of cold water and filtered again. This wash can be repeated several times, after which the double chromate of silver and bismuth, $AgBi(CrO_4)_2$ is dried at 150° C. for about 24 hours.

The following table compares the composition found in two samples to theoretical values corresponding to the formula $AgBi(CrO_4)_2$.

|  | Silver | Bismuth | $CrO_4$ |
|---|---|---|---|
| Theoretical Values | 19.66% | 38.08% | 42.26% |
| Experimental Value - Run 1 | 19.74 | 39.97 | 42.10 |
| Experimental Value - Run 2 | 19.77 | 38.12 | 42.35 |

As can be seen, the experimental values correspond perfectly with the theoretical values.

If during the preparation of the double chromate the reactants are not in stoichiometric proportions, the product will be contaminated with either $BiOHCrO_4$ or $Ag_2Cr_2O_7$, depending upon whether there is an excess of bismuth or an excess of silver. These impurities may or may not be acceptable, depending upon the purpose or ultimate use of the product. In particular, in using the product in an electrochemical generator, which will be described herein below and which also constitutes an object of this invention, silver dichromate should be avoided due to its solubility in organic solvents, while the presence of $BiOHCrO_4$ does not appear troublesome.

EXAMPLE II

Solid bismuth nitrate, $Bi(NO_3)_3 \cdot 5H_2O$, is added to a saturated, aqueous solution of $CrO_3$ at 20° C. The bismuth nitrate is added in the proportion of 800 g to one liter of solution. Then, enough silver dichromate is added to the solution to make the molar ratio of silver to bismuth equal to one, that is, 356 g for every 800 g of bismuth nitrate. The reaction mixture is stirred, preferably for a period of about 24 hours, to obtain the best yield. The reaction product is then filtered to recover the solid part, which is essentially a dichromate of silver and bismuth.

The recovered solid is then washed with water. The washing transforms the solid into $AgBi(CrO_4)_2$, with the elimination of dissolved $CrO_3$. The solubility of $AgBi(CrO_4)_2$ being extremely slight, the end of the wash is indicated by the disappearance of the orange color characteristic of solutions of $CrO_3$.

All of the preceding operations are effectively carried out at ambient temperatures. The product recovered will consist of particularly fine granules. The yield with respect to the starting reactants, bismuth nitrate and silver dichromate, is better than 95%.

In this variant of the method, the order of introducing the reactants is not critical. The silver dichromate may be mixed first with the solution of $CrO_3$, then the bismuth nitrate added, or the dry ingredients may be well mixed and then the solution of $CrO_3$ added to the mixture. It is only necessary to avoid, as in the preparation of bismuth chromate-dichromate, placing the bismuth nitrate in the presence of water, unless the water is in the form of a saturated solution of $CrO_3$ or some other sufficiently acidic solution to void hydrolysis of the bismuth nitrate. Likewise, it is preferable not to heat before the precipitation of the double dichromate has been achieved. Of course, here also the bismuth nitrate can be replaced by another soluble salt of bismuth. The required precision of the molar ratio of bismuth salt to silver dichromate depends on the degree of purity desired for the end product.

Generally in the process of the invention, it is necessary to take into account the tendency of bismuth salts to hydrolyze. On the other hand, the double salts of silver and bismuth are not hydrolyzable, which is why, in particular, the treatment with water of the dichromate double can be done without special precautions.

Within the limits thus fixed, other modifications of the invention can be made without departing from the spirit and scope of the invention.

From the point of view of crystallography, AgBi(CrO$_4$)$_2$ is an isomorph of scheelite, CaWO$_4$, which implies that silver and bismuth are randomly distributed at the sites corresponding to those of calcium in scheelite.

Several crystallographic characteristics are given below:

| Formula Pattern | Ag $\frac{1}{2}$Bi $\frac{1}{2}$CrO$_4$ |
| --- | --- |
| Spatial Grouping | I 4 1/A (N°88) |
| Parameters | a = 5.10 A, c = 11.85 A |
| Number of Formula Patterns per Lattice | z = 4 |
| Calculated Specific Mass | 5.91 |
| Measured Specific Mass | 5.79 |

The use of the double chromate of silver and bismuth in batteries avoids the drawbacks of the proposed prior art chromate materials by furnishing a positive active material less expensive than silver chromate but which also cischares at the same level as the latter during at least one part of the discharge. On the other hand, the solubility of the double chromate of silver and bismuth in organic solvents is much less than that of silver chromate, which lower solubility is more favorable to long battery life under conditions of prolonged keeping or of discharge to a very low state.

Advantageously, the solvent of the electrolyte is an aprotic composition, and the positive active material formed from the double chromate of silver and bismuth includes an added electrical conductor.

This positive active material is discharged by the transformation of silver and bismuth to the metallic state. The discharge employs 4 electrons, one for the monovalent silver and 3 for the trivalent bismuth. It can be observed that the voltage of such a battery stays at a level corresponding to the discharge voltage of silver for twice the time needed for discharge of the silver; that is to say, during the time of utilization of two electrons. A part of the bismuth discharges, therefore, at the level of silver, although the theoretical oxidation-reduction potential of bismuth is inferior by approximately 0.7 volts to that of silver. Accordingly, for an equal discharge, a salt can be used which contains only half the quantity of silver, with a resulting economy.

The utilization of double chromate of silver and bismuth according to the invention will be better understood from the example described below as illustrated by the single drawing, which represents the discharge curve of a battery made according to this invention.

Button-type batteries have been prepared with a cathode made of a mixture of double chromate of silver and bismuth, 97% by weight; carbon black, 1% by weight; and graphite, 2% by weight. In these batteries, the cathode has a thickness of 0.2 cm. and a cross-section of 1.01 cm$^2$, which corresponds to a theoretical capacity (computed from the reduction of silver and bismuth to the metallic state) of 116mAh. A separator, made of a cellulose felt soaked with a molar solution of lithium perchlorate in propylene carbonate, is disposed on the cathode. The negative electrode is a pellet of lithium.

These batteries have been discharged across a resistance of 62,000 ohms at a temperature of 37° C.

In the accompanying figure, a typical discharge curve is represented having as abscissa the time of discharge J, in days, and as ordinate the voltage V, in volts, of the battery. As one can see from the figure, taking 2.9 volts as the end voltage of discharge (which corresponds to its use in a cardio-stimulator, the temperature of discharge being equally chosen in view of this application), the capacity supplied by the battery is 58 mAh; that is to say one-half of the theoretical capacity. Considering that the capacity due to the reduction of the silver into silver metal is one-fourth of the theoretical capacity, it can be seen that a part of this capacity is due to the bismuth, even though the discharge voltage remains the same as that of silver chromate. The results obtained are, therefore, the same as those which would have been obtained with double the quantity of silver.

For those applicatons which do not require such a constant voltage, it can be observed that by taking the end voltage as 2.5 volts, the discharge capacity becomes 85 mAh, for a yield of 73%. In this case, the results are close to those which would be obtained with three times the quantity of silver.

Thus, the economy which can result from employing double chromate of silver and bismuth can be seen.

It must be emphasized that the double chromate of silver and bismuth is in no way the equivalent to a mixture of silver chromate and bismuth chromate. With such a mixture, the silver chromate would be reduced at 3 volts and the chromate of bismuth at its own voltage level, which is clearly inferior.

In the preceding example, the electrolyte is a molar solution of lithium perchlorate in propylene carbonate. Other electrolytes can be used with comparable results, and in particular the electrolytes having as solvents those which are mentioned in French Pat. No. 2,122,011 or dioxolane. The concentration of solutes can be varied as well.

Of course, the positive active material according to this invention can be placed in batteries of other types than that which has been described in detail above.

The electrical conductor used in the above example, a mixture of carbon black and graphite, can be replaced by another conductor; carbon black can equally be used alone, or with the addition of fluorinated graphite or yet graphite alone, or any appropriate metal. The addition of graphite or fluorinated graphite to the carbon black is designed to facilitate compression of the active material, principally in batteries of the button type, which has the advantage of compressing the pulverized or powdered positive active material in the cup, both to improve the contact between the grains and to increase the quantity of materials used, and accordingly the capacity of the battery.

I claim:

1. A composition having the general formula:

MM'(CrO$_4$)$_2$ 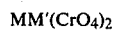

wherein M and M' represent silver and bismuth, respectively.

2. A nonaqueous electrolyte battery comprising a lithium negative electrode and wherein the positive active material comprises a double chromate of silver and bismuth, AgBi(CrO$_4$)$_2$.

3. A battery as recited in claim 2 further comprising an electrolyte which is a liquid solution at ambient temperatures of about 20° C., the solvent being an aprotic composition, and the positive active material including an added electrical conductor.

4. A battery as recited in claim 3 wherein the added electrical conductor comprises carbon black.

5. A battery as recited in claim 3 wherein the added electrical conductor comprises a mixture of carbon black and graphite.

6. A battery as recited in claim 3, 4 or 5 wherein the electrolyte is a molar solution of lithium perchlorate in propylene carbonate.

* * * * *

UNITED STATES PATENT AND TRADEMARK OFFICE
CERTIFICATE OF CORRECTION

PATENT NO. : 4,184,016
DATED : 15 January 1980
INVENTOR(S) : Andre Lecerf

It is certified that error appears in the above—identified patent and that said Letters Patent is hereby corrected as shown below:

Column 2, line 1: change "this", second occurrence, to --the--.

Column 3, line 35: change "to", second occurrence, to --at--.

Column 4, line 4: change "39.97" to --37.97--.
(Second line of table)

Column 4, line 57: change "void" to --avoid--.

Column 5, line 26: change "cischares" to --discharges--.

Column 6, line 17: change "applicatons" to --applications--.

Signed and Sealed this

Twenty-seventh Day of May 1980

[SEAL]

Attest:

SIDNEY A. DIAMOND

Attesting Officer     Commissioner of Patents and Trademarks